(12) United States Patent
Fujimoto et al.

(10) Patent No.: US 9,074,676 B2
(45) Date of Patent: Jul. 7, 2015

(54) ATTACHMENT STRUCTURE FOR PRIMARY GEAR OF ENGINE

(75) Inventors: Yasushi Fujimoto, Wako (JP); Kinya Mizuno, Wako (JP); Yoshiaki Tsukada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 775 days.

(21) Appl. No.: 13/041,659

(22) Filed: Mar. 7, 2011

(65) Prior Publication Data

US 2011/0220056 A1 Sep. 15, 2011

(30) Foreign Application Priority Data

Mar. 10, 2010 (JP) .................................. 2010-053753

(51) Int. Cl.
| | |
|---|---|
| F02B 75/32 | (2006.01) |
| F16H 57/033 | (2012.01) |
| F16H 55/17 | (2006.01) |
| F16H 3/00 | (2006.01) |

(52) U.S. Cl.
CPC .............. *F16H 57/033* (2013.01); *F16H 55/17* (2013.01); *F16H 3/006* (2013.01)

(58) Field of Classification Search
USPC ......... 192/48.611, 48.614, 48.8–48.91, 12 R, 192/20, 30 R
See application file for complete search history.

(56) References Cited

U.S. PATENT DOCUMENTS

| | | | | |
|---|---|---|---|---|
| 5,038,731 | A * | 8/1991 | Shimada ..................... | 123/192.2 |
| 7,131,412 | B2 * | 11/2006 | Tsutsumi et al. ........ | 123/179.25 |
| 7,174,800 | B2 * | 2/2007 | Kawakubo et al. .......... | 74/337.5 |
| 2006/0219034 | A1 * | 10/2006 | Hori et al. ....................... | 74/330 |
| 2008/0023291 | A1 * | 1/2008 | Sorani et al. ................. | 192/87.1 |
| 2008/0128239 | A1 * | 6/2008 | Ogasawara ................. | 192/85 R |

FOREIGN PATENT DOCUMENTS

| | | |
|---|---|---|
| JP | 2006-283797 | 10/2006 |
| JP | 2009-162202 | 7/2009 |

* cited by examiner

*Primary Examiner* — Hung Q Nguyen
*Assistant Examiner* — Ruben Picon-Feliciano
(74) *Attorney, Agent, or Firm* — Squire Patton Boggs (US) LLP

(57) ABSTRACT

A primary drive gear 10 is configured so as to have its position changed, by mounting the primary drive gear 10 in an axial direction within a length range of a crankshaft so as to displace a toothed portion 12 of said primary drive gear 10 in the axial direction of said crankshaft in response to a boss portion 13 integrally provided on said toothed portion 12 of said primary drive gear 10 so that said primary drive gear 10 is registered with a position in the axial direction of the primary driven gear meshing with said primary drive gear 10.

13 Claims, 5 Drawing Sheets

ATTACHMENT STRUCTURE FOR PRIMARY GEAR OF ENGINE

BACKGROUND

1. Field

Embodiments of the present invention relate to an attachment structure for a primary gear of an engine for transmitting power from a crankshaft to a transmission.

2. Description of the Related Art

An engine can be provided with a manual transmission or an automatic transmission. For example, in Japanese Patent Laid-Open No. 2009-162202, an engine is disclosed which includes a manual transmission for holding a primary driven gear fitted on a main shaft in meshing engagement with a primary drive gear that rotates together with a crankshaft of an internal combustion engine to transmit power to the main shaft through a clutch. On the other hand, in Japanese Patent Laid-Open No. 2006-283797, an engine is disclosed which includes an automatic transmission that includes two clutches provided on a main shaft and a primary driven gear disposed between the clutches.

SUMMARY

Therefore, from the perspective of operability enhancement or the like, there is a need for a vehicle which includes an automatic transmission in place of the manual transmission which has been incorporated heretofore. However, if an engine for exclusive use with a manual transmission and another engine for exclusive use with an automatic transmission are designed separately from each other, then a plurality of engines must be prepared even if the engines have similar engine forms, such as a displacement volume, a number of cylinders and so forth, and the flexibility of parts is insufficient and an increased fabrication cost is required. Therefore, it may be desirable to make it possible to use as many common parts as possible, such as a crankcase and so forth, between an engine in which a manual transmission is incorporated and another engine in which an automatic transmission is incorporated. This would achieve diversion of parts to thereby facilitate transition from a manual transmission to an automatic transmission (or transition from an automatic transmission to a manual transmission) and also decrease the fabrication costs.

However, it is difficult to divert several parts between the manual transmission and the automatic transmission due to a difference in configuration. In particular, in a relationship between the manual transmission according to Japanese Patent Laid-Open No. 2009-162202 and the automatic transmission according to Japanese Patent Laid-Open No. 2006-283797, they are different from each other in disposition of a pair of primary gears (drive, driven) in an axial direction and from a difference in configuration between clutches. Therefore, also in the case wherein a crankcase and so forth can be used commonly, the length of the crankshaft is obliged to be changed and it cannot be avoided to individually fabricate separate crankshafts whose fabrication cost is comparatively high.

Embodiments of the present invention have been made in view of such a situation as described above, and it is an object of the present invention to provide an attachment structure for a primary gear of an engine wherein a crankshaft can be diverted to achieve reduction of the fabrication costs even in the case wherein there is a difference in an engine form.

One embodiment is directed to an attachment structure for a primary gear of an engine. The engine may include a crankshaft accommodated in a crankcase, a main shaft disposed in parallel to the crankshaft, a primary drive gear (mounted on the crankshaft, and a primary driven gear (mounted on the main shaft for meshing with the primary drive gear to transmit power to the main shaft through a clutch. is The primary drive gear is mounted for position changing in an axial direction of the crankshaft within a length range of the crankshaft so as to displace a toothed portion of the primary drive gear in the axial direction of the crankshaft in response to a boss portion integrally provided on the toothed portion of the primary drive gear, so that the primary drive gear is registered with a position in the axial direction of the primary driven gear meshing with the primary drive gear.

In another embodiment, the attachment structure for the primary gear of the engine is characterized in that the primary drive gear can be mounted reversely.

According to one embodiment, the attachment structure for the primary gear of the engine is characterized in that an extension for mounting the primary drive gear thereon is provided on the end portion side of the crankshaft within the length range of the crankshaft and a projection, which is projected in conformity with the extension, is provided on the boss portion of the primary drive gear The boss portion can be displaced on the extension of the crankshaft.

According to another embodiment, the attachment structure for the primary gear of the engine is characterized in that the primary drive gear and a cylindrical member formed separately are disposed in a juxtaposed relationship in the axial direction of the crankshaft. The toothed portion of the primary drive gear is registered with the position in the axial direction of the primary driven gear.

According to another embodiment, the attachment structure for the primary gear of the engine is characterized in that the cylindrical member is provided so as to contact with the primary drive gear and can be disposed on the inner side or the outer side of the primary drive gear in the axial direction of the crankshaft.

According to another embodiment, the attachment structure for the primary gear of the engine is characterized in that the clutch is a twin clutch (including a pair of clutch housings provided in a juxtaposed relationship with each other in an axial direction for individually transmitting power to the main shaft of an inner and outer dual structure with the primary driven gear interposed therebetween.

According to another embodiment, the attachment structure for the primary gear of the engine is characterized in that the projection or the cylindrical member is disposed so as to overlap with the clutch housing on the inner side in the axial direction from between the paired clutch housings in a radial direction of the clutch housing.

According to another embodiment, the attachment structure for the primary gear of the engine is characterized in that the projection or the cylindrical member is disposed so as to be included in the width in the axial direction of the clutch housing on the inner side in the axial direction from between the paired clutch housings.

Another embodiment is directed to an attachment structure for a primary gear of an engine. The structure includes crankshaft means for providing rotational motion to the engine, crankcase means for accommodating the crankshaft means, main shaft means for supporting primary driven gear means, the main shaft means disposed in parallel to the crankshaft means, primary drive gear means mounted on the crankshaft means, and primary driven gear means for meshing with the primary drive gear and for transmitting power to the main shaft through a clutch means, the primary driven gear means mounted on the main shaft means. A position of the primary drive gear means can be changed and the primary drive gear means is mounted in an axial direction of the crankshaft means within a length range of the crankshaft means so as to displace a toothed portion of the primary drive gear means in the axial direction of the crankshaft means in response to a boss portion integrally provided on the toothed portion of said primary drive gear means. The primary drive gear means is registered with a position in the axial direction of the primary driven gear means meshing with said primary drive gear means.

Another embodiment includes a method of providing attachment structure for a primary gear of an engine. The method includes providing, by a crankshaft, rotational motion to the engine, accommodating the crankshaft in a crankcase, supporting, by a main shaft, a primary driven gear, and disposing the main shaft in parallel to the crankshaft. The method also includes mounting a primary drive gear on the crankshaft, and meshing a primary driven gear with the primary drive gear transmitting power to the main shaft through a clutch, and mounting the primary driven gear on the main shaft. The method further includes configuring the primary drive gear so that its position can be changed and mounting the primary drive gear in an axial direction of the crankshaft within a length range of the crankshaft so as to displace a toothed portion of the primary drive gear in the axial direction of the crankshaft in response to a boss portion integrally provided on the toothed portion of the primary drive gear. The primary drive gear is registered with a position in the axial direction of the primary driven gear meshing with the primary drive gear.

DETAILED DESCRIPTION

Figure 1:
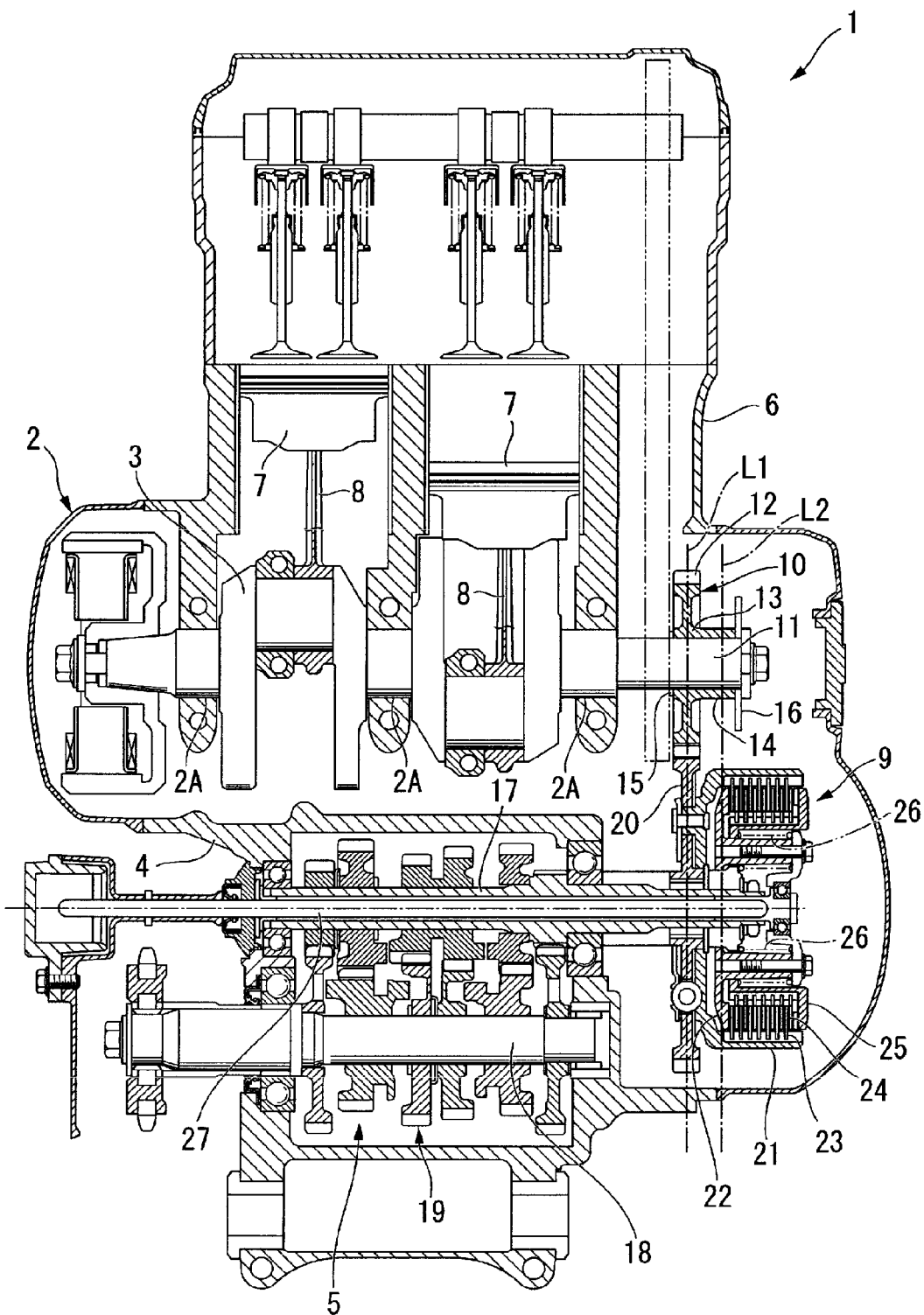
FIG. 1 is a sectional view of an engine according to a first embodiment of the present invention.

In the following, embodiments of the present invention are described with reference to the drawings. FIG. 1 shows a cross section of an engine 1 having a structure according to a first embodiment of the present invention.

In one embodiment, the engine 1 may be a parallel two-cylinder engine and a crankshaft 3 is accommodated in a crankcase 2 of the engine 1. A transmission 5 is accommodated in a mission case 4 coupled with the crankcase 2. A cylinder block 6 is provided uprightly on the crankcase 2 and a piston 7 corresponding to each cylinder is fitted for reciprocating motion in the cylinder block 6. A connecting rod 8 is connected at one end thereof to each piston 7 and connected at the other end thereof to the crankshaft 3.

According to an embodiment, the crankshaft 3 is supported for rotation on a plurality of journal bearings 2A formed on the crankcase 2 and projects from the journal bearings 2A positioned at the opposite ends of the crankcase 2. An attachment portion 11 on which a groove for spline fitting with a primary drive gear 10 is formed is formed at an end portion on one side of the projecting crankshaft 3. The length of the attachment portion 11 is set within a predetermined length range in a crankshaft axial direction.

In one embodiment, the primary drive gear 10 includes a boss portion 13 inserted in the attachment portion 11 in an inner diametrical direction of a toothed portion 12 and a projection 14 formed integrally with the boss portion 13. Projection 14 projects in an axial direction of the crankshaft 3 along the attachment portion 11. A plurality of convexes for engaging with the groove of the attachment portion 11 are formed on the boss portion 13 and the projection 14.

In an embodiment, the boss portion 13 is directed to the inner side of the engine 1 on the attachment portion 11. Boss portion 13 contacts with a positioning portion 15 formed on the circumferential face of the crankshaft 3 and projecting in an outer diametrical direction so that the position thereof in the crankshaft axial direction is retained. The projection 14 is directed to the outer side of the engine 1 on the attachment portion 11 and contacts at an end portion thereof with and retained by a plate 16 secured by bolting to the end portion of the crankshaft 3.

In one embodiment, the transmission 5 may include a main shaft 17 disposed in parallel to the crankshaft 3, a countershaft 18 disposed in parallel to the main shaft 17, and a speed change gear group 19 disposed over the main shaft 17 and the countershaft 18. Driving force of the crankshaft 3 can be transmitted to the transmission 5 from a clutch 9 disposed sidewardly.

The clutch 9 may include a primary driven gear 20 held in meshing engagement with the primary drive gear 10 and supported for relative rotation on the main shaft 17. Clutch 9 may also include an outer housing 21 coupled with the primary driven gear 20 and projecting cylindrically, an inner housing 22 provided on the inner side of the outer housing 21 and coupled with the main shaft 17, and friction disks 23 and clutch disks 24 provided alternately in lamination between the outer housing 21 and the inner housing 22. Clutch 9 may further include a pressure plate 25 disposed so as to cooperate with the inner housing 22 to sandwich the friction disks 23 and the clutch disks 24 therebetween, and a spring 26 for elastically biasing the pressure plate 25 to the inner housing 22 side to hold the friction disk 23 and the clutch disk 24 in frictional meshing engagement with each other.

In one example of the clutch 9, the primary driven gear 20 is disposed on the inner side of the engine 1 in an axial direction of the main shaft 17, that is, in an axial direction of the crankshaft 3, with respect to the outer housing 21 and the inner housing 22. If the pressure plate 25 is displaced from the inner housing 22 side against the biasing force of the spring 26, then the clutch 9 is placed into a disengaged state. However, if the biasing force of the spring 26 is cancelled, then the clutch 9 is placed into an engaged state by the spring 26. Here, the main shaft 17 of the transmission 5 has a hollow shape and a pushrod 27 is inserted in the inside of the hollow portion of the main shaft 17. The pushrod 27 extends to the pressure plate 25 and pushes the pressure plate 25 so as to be displaced from the inner housing 22.

Figure 2:
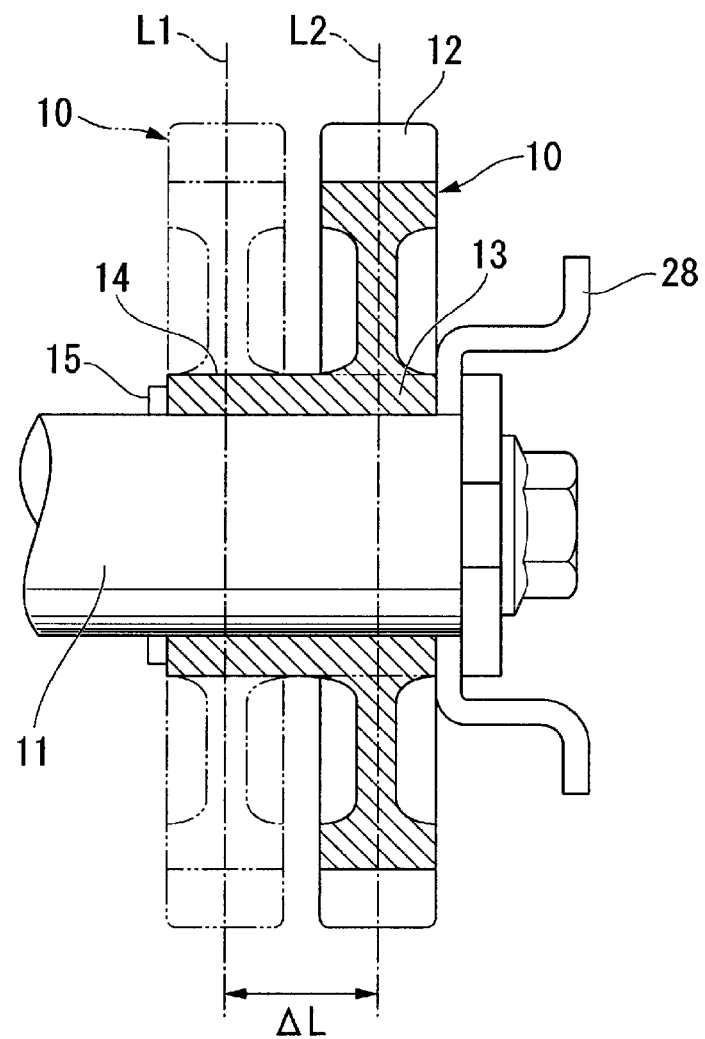
FIG. 2 is a sectional view of a crankshaft according to the first embodiment of the present invention.

In the present embodiment, the primary drive gear 10 can be attached reversely. For example, the primary drive gear 10 can be attached in a state shown in FIG. 1 in which the projection 14 of the primary drive gear 10 is directed to the outer side and another state in which the primary drive gear 10 is reversed from the state just described such that the projection 14 is directed to the inner side as shown in FIG. 2. In the example of FIG. 2, the projection 14 contacts with the positioning portion 15 formed on the circumferential of the crankshaft 3 and projecting in the diametrically outer direction so that the position thereof in the crankshaft direction is retained.

The boss portion 13 contacts with and is retained by a plate 28 fixed by bolting to the end of the crankshaft 3.

In this manner, in the present embodiment, the attachment posture of the primary drive gear 10 can be changed, and as a result, the position of the toothed portion 12 and the boss portion 13 of the primary drive gear 10 in the axial direction on the crankshaft 3 can be changed. More particularly, in FIGS. 1 and 2, reference symbol "L1" indicates the position of the toothed portion 12 and the boss portion 13 in the axial direction on the crankshaft 3 in a state in which the projection 14 of the primary drive gear 10 is directed to the outer side and the position of the primary driven gear 20 in the axial direction on the main shaft 17. Meanwhile, reference symbol "L2" indicates the position of the toothed portion 12 in the axial direction on the crankshaft 3 in a state wherein the projection 14 of the primary drive gear 10 is directed to the outer side. As recognized from the reference positions shown in FIGS. 1 and 2, in the present embodiment, the position of the toothed portion 12 and the boss portion 13 of the primary drive gear 10 in the axial direction on the main shaft 17 can be changed by a distance corresponding to the difference (indicated by ●L, in FIGS. 1 and 2) between L1 and L2.

Figure 3:
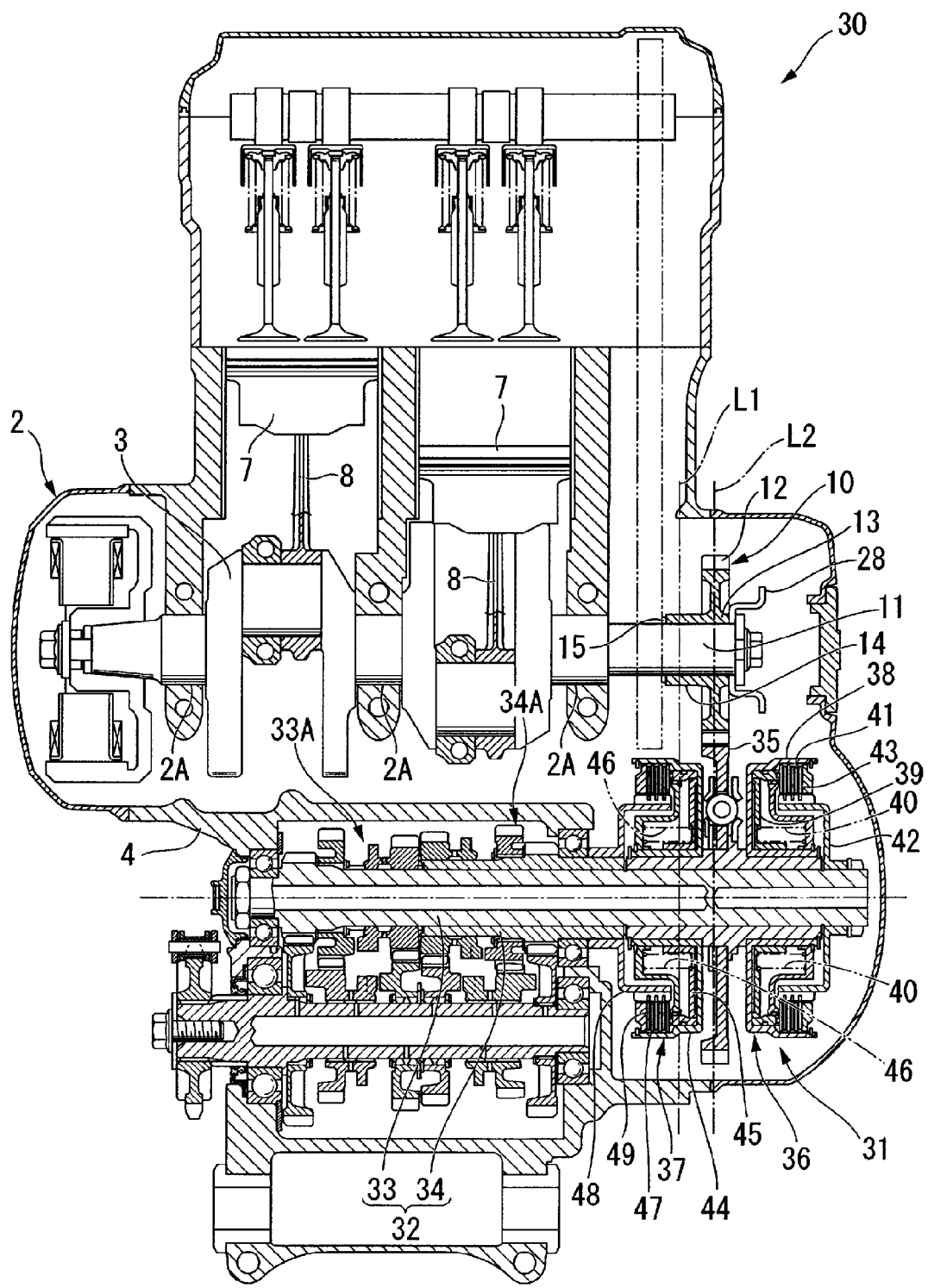
FIG. 3 is a sectional view of the engine according to the first embodiment of the present invention.

Here, in the example illustrated in FIG. 3, an engine 30 different from the engine 1 is shown, and the crankshaft 3 wherein the attachment position of the primary drive gear 10 is changed from that in the state shown in FIG. 1 is accommodated in the engine 30. In the engine 30, the number of cylinders or number of pistons is similar to that of the engine 1 and the crankcase 2 of the engine 1 is also used. However, a twin clutch 31 is incorporated in place of the clutch 9, and a main shaft of a transmission is configured in a dual structure corresponding to the twin clutch 31 and is configured by inserting an inner shaft 33 in an outer shaft 34.

According to an embodiment, a driving gear group 33A corresponding to first, third and fifth gears is provided on the inner shaft 33, and another driving gear group 34A corresponding to second, fourth and sixth gears is provided on the outer shaft 34. The twin clutch 31 may be configured from a first clutch 36 and a second clutch 37 provided in a back to back relationship with the primary driven gear 35 sandwiched therebetween in the axial direction of the main shaft 32. The primary driven gear 35 is supported for relative rotation on the main shaft 32. The first clutch 36 is disposed on the outer side with respect to the second clutch 37.

In the first clutch 36, a piston 39 inserted in a sealed state on the bottom of the outer housing 38 fixedly coupling with the primary driven gear 35 is provided. The piston 39 is configured such that, if hydraulic fluid is fed under pressure from an oil path not shown provided in the main shaft 32, then the piston is pushed out in a rightward direction in FIG. 3. However, if the pressure of the hydraulic fluid decreases, then the piston 39 is returned to the original position by elastic force of the spring 40. On the right side of the piston 39 in FIG. 3, a plurality of friction disks 41 coupled for sliding motion in the axial direction and fixedly in a rotational direction with respect to the outer housing 38 are disposed adjacent the piston 39. A plurality of clutch disks 43 coupled for sliding motion in the axial direction and fixedly in a rotational direction with respect to an arm 42 integrally coupled with the inner shaft 33 are sandwiched with a little space left from the friction disks 41.

In the second clutch 37, a piston 45 inserted in a sealed state on the bottom of the outer housing 44 fixedly coupling with the primary driven gear 35 is provided. The piston 45 is configured such that, if hydraulic fluid is fed under pressure from an oil path not shown provided in the main shaft 32, then the piston is pushed out in a leftward direction in FIG. 3. However, if the pressure of the hydraulic fluid decreases, then the piston 45 is returned to the original position by elastic force of the spring 46. On the left side of the piston 45 in FIG. 3, a plurality of friction disks 47 coupled for sliding motion in the axial direction and fixedly in a rotational direction with respect to the outer housing 44 are disposed adjacent the piston 45. A plurality of clutch disks 49 coupled for sliding motion in the axial direction and fixedly in a rotational direction with respect to an arm 48 integrally coupled with the outer shaft 34 are sandwiched with a little space left from the friction disks 47.

"L1" indicated in FIG. 1 is also indicated in FIG. 3 and, in the engine 30, the position of the primary driven gear 35 is spaced toward the outer side in comparison with that in the engine 1. Here, in the engine 30, the attachment position of the primary drive gear 10 to the crankshaft 3 is changed to register the positions of the primary drive gear 10 and the primary driven gear 35 with each other and engage the gears 10 and 35 with each other. In particular, the crankshaft 3 is diverted to the different engine. In the engine 30, the projection 14 is disposed so as to overlap with the outer housing 44 on the inner side in the axial direction from between the paired outer housings 38 and 44 of the twin clutch 31 in the radial direction of the outer housing 44. Further, the projection 14 is disposed so as to be included in the width in the axial direction of the outer housing 44.

As described above, in the present embodiment, the primary drive gear 10 can be attached reversely. Further, the primary drive gear 10 is attached for position changing in the axial direction within the length range of the attachment portion 11 of the crankshaft 3 such that the toothed portion 12 of the primary drive gear 10 is displaced in the axial direction of the crankshaft 3 in response to the integrally provided boss portion 13 so that the primary drive gear is registered with the position of the engaging primary driven gear 20 in the axial direction. Consequently, since the position of the primary drive gear 10 in the axial direction can be changed without changing the length of the crankshaft 3, the crankshaft 3 can be diverted and the fabrication cost can be decreased also in the engine 30 wherein the clutch type thereof is different from that of the engine 1 and the position of the primary driven gear 35 in the axial direction is different from that of the primary driven gear 20 as seen in FIG. 3. In particular, the fabrication cost when the fabrication object is changed over from the engine 1 to the engine 30 can be decreased.

Further, the attachment portion 11 for attaching the primary drive gear is provided on the end side of the crankshaft 3 within the length range of the crankshaft 3. The projection 14 projecting corresponding to the attachment portion 11 is provided at the boss portion 13 of the primary drive gear 10 so that the projection 14 can be displaced at the attachment portion 11. In the configuration described, since the position of the primary drive gear 10 can be adjusted by the integral projection 14 wherein the boss portion 13 is projected corresponding to the attachment portion 11 without changing the length of the crankshaft 3, the number of parts can be reduced.

Next, a second embodiment of the present invention is described. In the present embodiment, the shape of the primary drive gear is different from that in the first embodiment. The present embodiment is used for the engines 1 and 30 described in the description of the first embodiment. The components that are the same as those in the first embodiment are denoted by like reference symbols and a description of those components is omitted.

Figure 4:
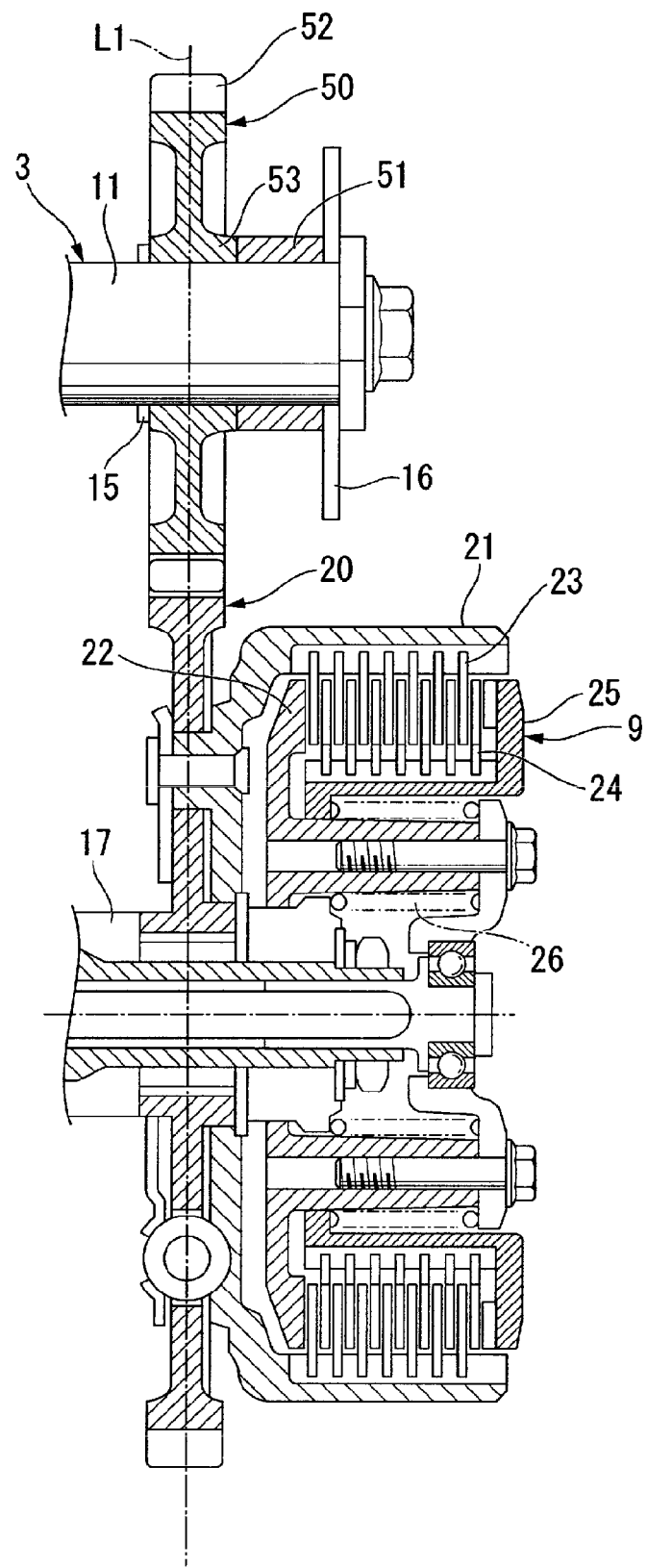
FIG. 4 is a section view of essential part of an engine according to a second embodiment of the present invention.

As shown in the example of FIG. 4, in the present embodiment, a primary drive gear 50 and a collar 51 which is a cylindrical member independent of the gear 50 are disposed in a juxtaposed relationship in the axial direction of the crankshaft 3. A toothed portion 52 and a boss portion 53 of the primary drive gear 50 are registered with the position of a primary driven gear 35 in an axial direction.

Figure 5:
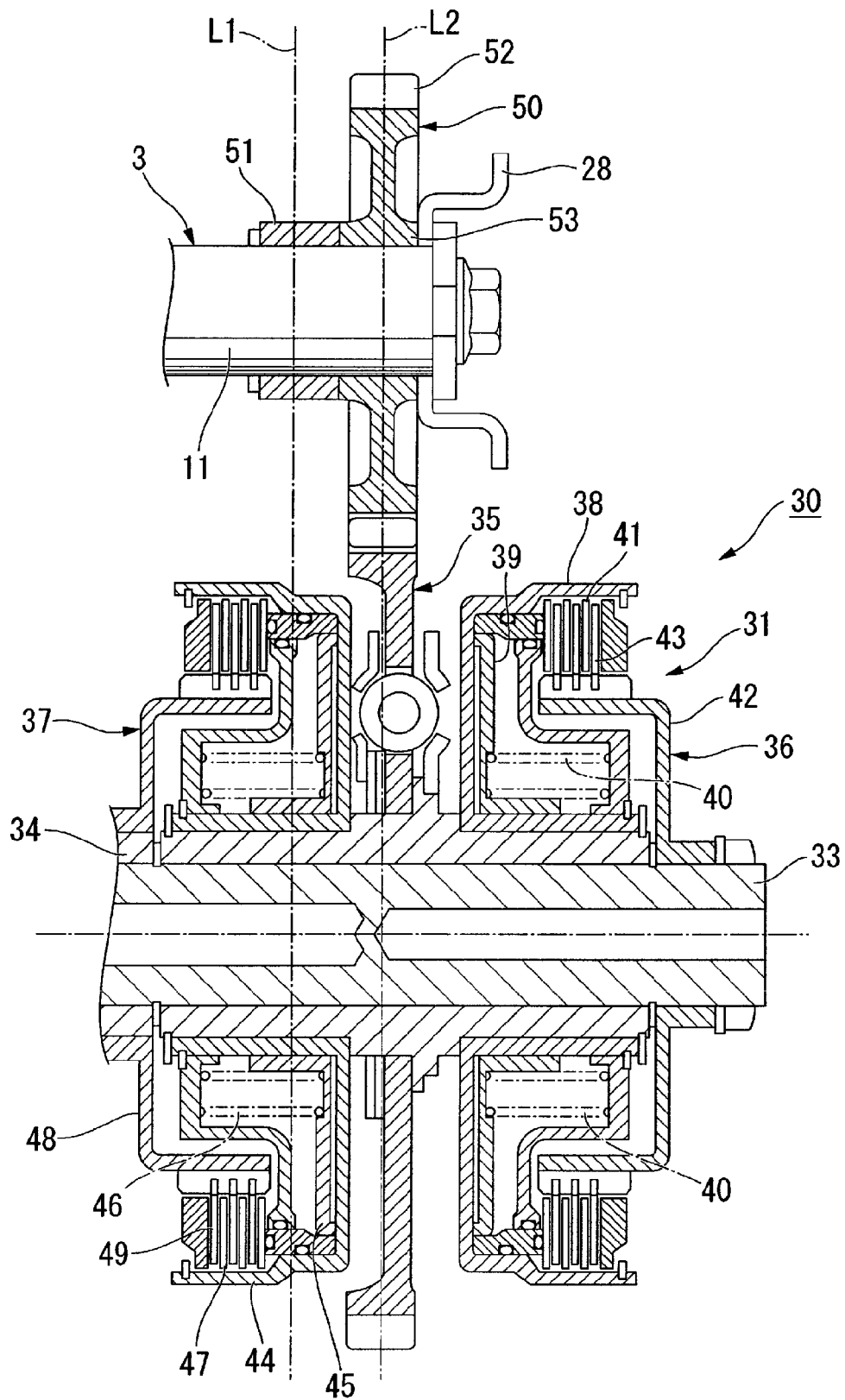
FIG. 5 is a sectional view of essential part of the engine according to the second embodiment of the present invention.

Referring to FIG. 5, in the present embodiment, the collar 51 disposed on the outer side of the engine 1 in FIG. 4 can be disposed on the inner side of the engine 30 to adjust the position of the primary drive gear 50 in the axial direction so that it is registered with the position in the axial direction of the primary driven gear 35 of the engine 30 in which the twin clutch 31 is incorporated (from L1 to L2). Here, while the primary drive gear 50 can be attached reversely, there is no difference in shape between the opposite faces, and it is optionally determined which face is directed to the inner side or the outer side.

As described above, in the present embodiment, the primary drive gear 50 and the collar 51 independent of the gear 50 are disposed in a juxtaposed relationship with each other in the axial direction of the crankshaft 3. The toothed portion 52 of the primary drive gear 50 is registered with the position of the primary driven gear in the axial direction. Consequently, only by changing the length of the collar 51, the position of the primary drive gear 50 in the axial direction can be changed without changing the length of the crankshaft 3. Therefore, since the crankshaft 3 can be diverted for use with the engine 30 wherein the position of the primary driven gear 35 in the axial direction is different from that in the primary driven gear 20, the fabrication cost can be reduced. Further, since the primary drive gear 50 and the collar 51 are provided independently of each other, the present embodiment can be easily applied to various engine types only by changing the length of the collar 51 in response to the length of the crankshaft.

In one embodiment, the position of the primary drive gear in the axial direction can be changed without changing the length of the crankshaft, for example. As a result, the same crankshaft can be used in another engine wherein the clutch type is different and the position of the primary driven gear in the axial direction is different, irrespective of the position of the primary driven gear in the axial direction. Therefore, the fabrication cost can be reduced.

In another embodiment, by projecting the boss portion in response to the extension without changing the length of the crankshaft, the position of the primary drive gear is adjusted. Therefore, the crankshaft can be diverted for use with another engine wherein the position of the primary driven gear in the axial direction is different, and the fabrication cost can be decreased. Further, since the projection projecting from the boss portion and the toothed portion are integrally provided, the number of parts can be decreased.

According to another embodiment, by disposing the primary drive gear and the cylindrical member independent of the gear in a juxtaposed relationship in the axial direction of the crankshaft, the position of the paired primary gears in the axial direction can be changed just by changing the length of the cylindrical member without changing the length of the crankshaft. Consequently, the crankshaft can be diverted for use with another engine wherein the position of the primary driven gear in the axial direction is different, and the fabrication cost can be decreased. Further, since the primary drive gear and the cylindrical member are provided independently of each other, the present invention can easily cope with various engine types only by changing the length of the cylindrical member in response to the length of the crankshaft.

In another embodiment, by disposing the cylindrical member on the inner side or the outer side of the primary drive gear upon assembly of the primary drive gear, the position of the primary drive gear corresponding to the primary driven gear can be adjusted.

According to another embodiment, a common crankshaft can be used in an engine with a twin clutch configuration wherein the primary driven gear is disposed at the center between clutches and in a different engine, by changing the disposition of the paired primary gears without changing the length of the crankshaft. Thus, the fabrication costs can be reduced.

In one embodiment, by disposing the projection or the cylindrical member in the twin clutch configuration so as to overlap with the clutch housing on the inner side of the axial direction in the radial direction, the crankshaft can be diverted between use an engine of the twin clutch type and in a different engine. Further, the length of the crankshaft can be set short in comparison with an alternative case wherein the projection or the cylindrical member overlaps with the clutch housing on the outer side of the axial direction in the radial direction.

According to another embodiment, the crankshaft can be diverted for use with an engine of the twin clutch type and a different engine while the projection or the cylindrical member is compactly configured in the axial direction in the twin clutch configuration.

While the present invention has been described in connection with the first embodiment and the second embodiment, the configurations in the embodiments described above are examples of the present invention and it is a matter of course that various changes can be applied without departing from the spirit or scope of the present invention including a configuration, a structure, a shape, a size, a number, disposition and so forth of parts. For example, while the examples are described wherein the crankshaft is diverted between the single clutch and the twin clutch in the description of the embodiments given hereinabove, the present invention can be applied, for example, also to a case wherein the widthwise dimension of the clutch is different. Further, while the examples are described wherein the primary drive gear is spline fitted in the description of the embodiments given hereinabove, a mode wherein a key groove is formed and the primary drive gear is supported against relative rotation by a key or the like may be applied.

DESCRIPTION OF REFERENCE SYMBOLS

1 Engine
2 Crankcase
3 Crankshaft
9 Clutch
10, 50 Primary drive gear
11 Extension (attachment portion)
12 Toothed portion
13 Boss portion
14 Projection
17 Main shaft
20, 35 Primary driven gear
21 Outer housing (clutch housing)
22 Inner housing (clutch housing)
31 Twin clutch
38, 44 Outer housing (clutch housing)
51 Collar (cylindrical member)
52 Toothed portion

We claim:
1. An attachment structure for a primary gear of an engine, comprising:
a crankshaft accommodated in a crankcase;

a main shaft disposed in parallel to said crankshaft;
a primary drive gear mounted on said crankshaft; and
a primary driven gear mounted on said main shaft and configured to mesh with said primary drive gear to transmit power to said main shaft through a clutch,
wherein a position of said primary drive gear is configured to be changed and is mounted in an axial direction of said crankshaft within a length range of said crankshaft so as to displace a toothed portion of said primary drive gear in the axial direction of said crankshaft in response to a boss portion integrally provided on said toothed portion of said primary drive gear, wherein said primary drive gear is registered with a position in the axial direction of said primary driven gear meshing with said primary drive gear,
wherein said primary drive gear is configured to be mounted in a first direction, and in a second direction reverse of the first direction, so as to accommodate one of a manual transmission or an automatic transmission,
wherein the primary driven gear is disposed on an inner side of the engine in an axial direction of the main shaft,
wherein said clutch comprises a twin clutch comprising a pair of clutch housings provided in a juxtaposed relationship with each other in an axial direction and configured to individually transmit power to said main shaft of an inner and outer dual structure with said primary driven gear interposed therebetween, and
wherein the twin clutch comprises a first clutch and a second clutch provided in a back to back relationship with the primary driven gear sandwiched therebetween in the axial direction of the main shaft; and an extension to which said primary drive gear is mounted, wherein the extension is provided on the end portion side of said crankshaft within the length range of said crankshaft; and a projection projected in conformity with said extension is provided on said boss portion of said primary drive gear, and said boss portion is configured to be displaced on said extension of said crankshaft.

2. The attachment structure for the primary gear of the engine according to claim 1, wherein said primary drive gear and a cylindrical member formed separately are disposed in a juxtaposed relationship in the axial direction of said crankshaft, and said toothed portion of said primary drive gear is registered with the position in the axial direction of said primary driven gear.

3. The attachment structure for the primary gear of the engine according to claim 2, wherein said cylindrical member is provided so as to contact with said primary drive gear and configured to be disposed on the inner side or the outer side of said primary drive gear in the axial direction of said crankshaft.

4. The attachment structure for the primary gear of the engine according to claim 1, wherein said projection or said cylindrical member is disposed so as to overlap with said clutch housing on the inner side in the axial direction from between the paired clutch housings in a radial direction of said clutch housing.

5. The attachment structure for the primary gear of the engine according to claim 4, wherein said projection or said cylindrical member is disposed so as to be included in the width in the axial direction of said clutch housing on the inner side in the axial direction from between the paired clutch housings.

6. An attachment structure for a primary gear of an engine, comprising:
crankshaft means for providing rotational motion to the engine;
crankcase means for accommodating the crankshaft means;
main shaft means for supporting primary driven gear means, the main shaft means disposed in parallel to said crankshaft means;
primary drive gear means mounted on said crankshaft means; and
primary driven gear means for meshing with said primary drive gear and for transmitting power to said main shaft through a clutch means, the primary driven gear means mounted on said main shaft means,
wherein a position of said primary drive gear means can be changed and said primary drive gear means is mounted in an axial direction of said crankshaft means within a length range of said crankshaft so as to displace a toothed portion of said primary drive gear means in the axial direction of said crankshaft means in response to a boss portion integrally provided on said toothed portion of said primary drive gear means, wherein said primary drive gear means is registered with a position in the axial direction of said primary driven gear means meshing with said primary drive gear means,
wherein said primary drive gear means is configured to be mounted in a first direction, and a second direction reverse of the first direction, so as to accommodate one of a manual transmission or an automatic transmission,
wherein the primary driven gear means is disposed on an inner side of the engine in an axial direction of the main shaft means,
wherein said clutch means comprises twin clutch means comprising a pair of housings means provided in a juxtaposed relationship with each other in an axial direction and for individually transmitting power to said main shaft means of an inner and outer dual structure with said primary driven gear means interposed therebetween, and
wherein the twin clutch means comprises a first clutch means and a second clutch means provided in a back to back relationship with the primary driven gear means sandwiched therebetween in the axial direction of the main shaft means; and extension means for mounting said primary drive gear means thereon, wherein the extension means is provided on the end portion side of said crankshaft means within the length range of said crankshaft means; projection means projected in conformity with said extension means is provided on said boss portion of said primary drive gear means; and displacing means for displacing said boss portion on said extension means of said crankshaft means.

7. The attachment structure for the primary gear of the engine according to claim 6, wherein said primary drive gear means and a cylindrical member means formed separately are disposed in a juxtaposed relationship in the axial direction of said crankshaft means, and said toothed portion of said primary drive gear means is registered with the position in the axial direction of said primary driven gear means.

8. The attachment structure for the primary gear of the engine according to claim 7, wherein said cylindrical member means is provided so as to contact with said primary drive gear means and configured to be disposed on the inner side or the outer side of said primary drive gear means in the axial direction of said crankshaft means.

9. The attachment structure for the primary gear of the engine according to claim 6, wherein said projection means or said cylindrical member means is disposed so as to overlap with said housing means on the inner side in the axial direction from between the paired housing means in a radial direction of said housing means.

10. The attachment structure for the primary gear of the engine according to claim 9, wherein said projection means or said cylindrical member means is disposed so as to be included in the width in the axial direction of said housing means on the inner side in the axial direction from between the paired housing means.

11. A method of providing attachment structure for a primary gear of an engine, comprising:
provided, by a crankshaft, rotational motion to the engine;
accommodating the crankshaft in a crankcase;
supporting, by a main shaft, a primary driven gear, and disposing the main shaft in parallel to the crankshaft;
mounting a primary drive gear on said crankshaft; and
meshing a primary driven gear with said primary drive gear transmitting power to said main shaft through a clutch, and mounting the primary driven gear on said main shaft,
configuring said primary drive gear so that its position can be changed and mounting said primary drive gear in an axial direction of said crankshaft within a length range of said crankshaft so as to displace a toothed portion of said primary drive gear in the axial direction of said crankshaft in response to a boss portion integrally provided on said toothed portion of said primary drive gear, wherein said primary drive gear is registered with a position in the axial direction of said primary driven gear meshing with said primary drive gear,
disposing the primary driven gear on an inner side of the engine in an axial direction of the main shaft,
wherein said clutch comprises a twin clutch comprising a pair of clutch housings provided in a juxtaposed relationship with each other in an axial direction and configured to individually transmit power to said main shaft of an inner and outer dual structure with said primary driven gear interposed therebetween,
wherein the twin clutch comprises a first clutch and a second clutch provided in a back to back relationship with the primary driven gear sandwiched therebetween in the axial direction of the main shaft, and
wherein said primary drive gear is configured to be mounted in a first direction, and in a second direction reverse of the first direction, so as to accommodate one of a manual transmission or an automatic transmission.

12. The method according to claim 11, further comprising:
mounting said primary drive gear on an extension, wherein the extension is provided on the end portion side of said crankshaft within the length range of said crankshaft;
providing a projection that is projected in conformity with said extension on said boss portion of said primary drive gear; and
displacing said boss portion on said extension of said crankshaft.

13. The method according to claim 11, disposing said primary drive gear and a cylindrical member formed separately in a juxtaposed relationship in the axial direction of said crankshaft, and registering said toothed portion of said primary drive gear with the position in the axial direction of said primary driven gear.

* * * * *